United States Patent [19]
Sumida et al.

[11] Patent Number: 5,272,710
[45] Date of Patent: Dec. 21, 1993

[54] STRESS-FREE MOUNTING AND PROTECTION OF LIQUID-COOLED SOLID-STATE LASER MEDIA

[75] Inventors: David S. Sumida, Los Angeles; Robert W. Byren, Hermosa Beach, both of Calif.

[73] Assignee: Hughes Aircraft Company, Los Angeles, Calif.

[21] Appl. No.: 941,626

[22] Filed: Sep. 8, 1992

[51] Int. Cl.$^5$ ............................................ H01S 3/04
[52] U.S. Cl. ........................................ 372/35; 372/34; 372/72
[58] Field of Search ................. 372/35, 34, 72, 65, 372/92

[56] References Cited

U.S. PATENT DOCUMENTS

| | | | |
|---|---|---|---|
| 4,637,028 | 1/1987 | Kahan | 372/34 |
| 4,751,716 | 6/1988 | Ream et al. | 372/72 |
| 4,897,851 | 1/1990 | Vecht et al. | 372/35 |
| 4,969,155 | 11/1990 | Kahan | 372/35 |
| 5,107,513 | 4/1992 | Sagie et al. | 372/35 |

FOREIGN PATENT DOCUMENTS 8601344 2/1986 PCT Int'l Appl. ............... 372/35

*Primary Examiner*—Georgia Y. Epps
*Attorney, Agent, or Firm*—M. E. Lachman; M. W. Sales; W. K. Denson-Low

[57] ABSTRACT

A laser structure that reduces thermally-induced mounting stress on low fracture strength solid-state laser rods. A transparent sleeve of relatively high strength optical material that has relatively high thermal conductivity is provided around the laser rod, and a thin layer of elastomer is provided between the laser material and the transparent sleeve. This arrangement of laser material, transparent sleeve, and elastomer allows sealing of a cooling fluid flow channel disposed around the laser/sleeve assembly using conventional means without applying stress directly to the laser rod material. This reduces the risk of fracturing the laser rod material due to thermal expansion near the seal and allows the laser to be operated at higher average power levels. The elastomer layer and high thermal conductivity sleeve efficiently conduct heat from the laser rod to the surrounding cooling liquid. This structure also minimizes damage to the surface of the strengthened laser rods due to handling and coolant erosion thereby preserving the thermal stress fracture resistance properties of the laser rod during transport, manufacturing assembly, operation, and maintenance.

17 Claims, 2 Drawing Sheets

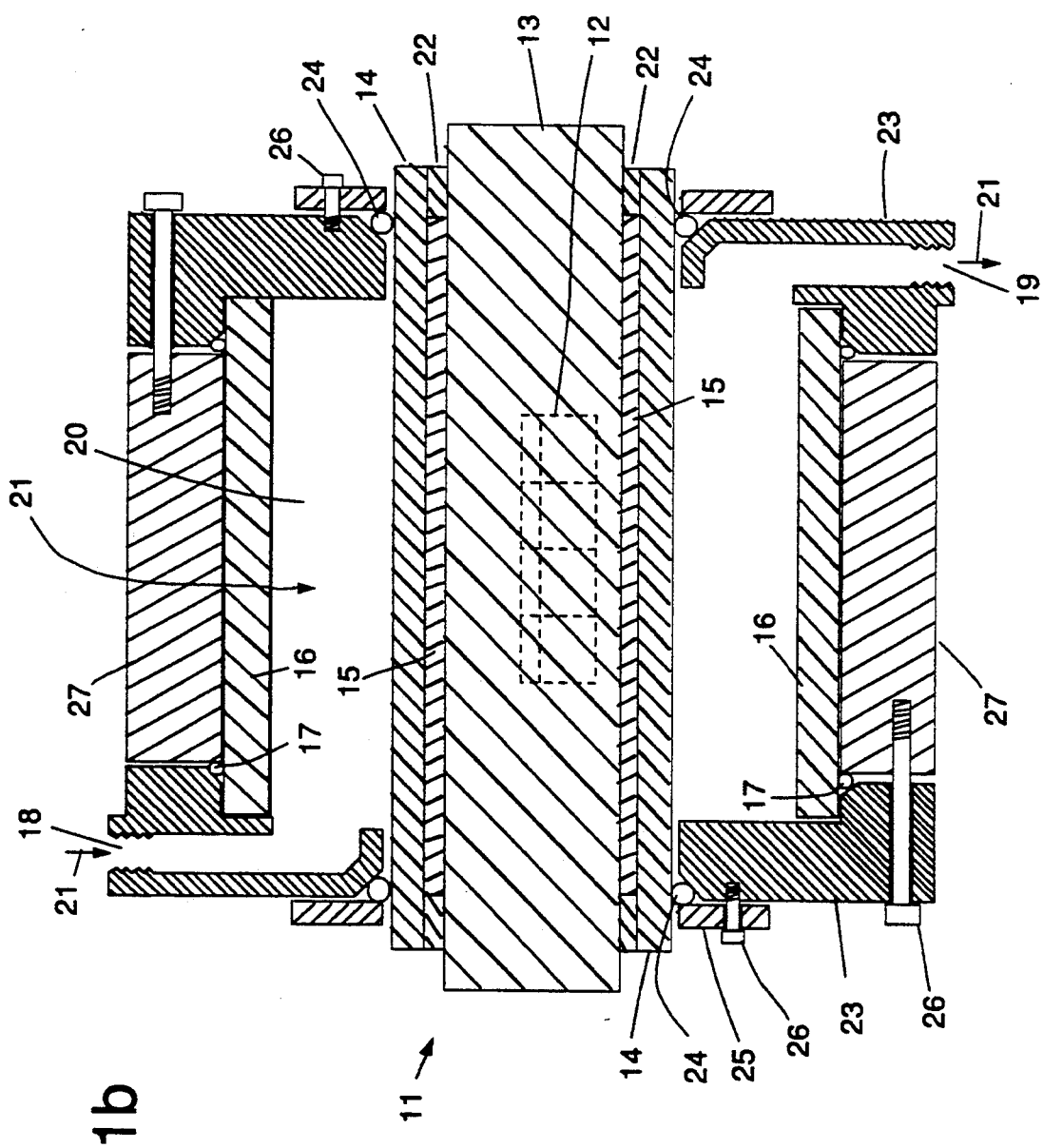

STRESS-FREE MOUNTING AND PROTECTION OF LIQUID-COOLED SOLID-STATE LASER MEDIA

This invention was made with United States Government support under Contract No. DAAB07-91-C-K755 awarded by the Department of the Army. The U.S. Government has certain rights in this invention.

BACKGROUND OF THE INVENTION

1. Field of the Invention

The present invention relates generally to solid state lasers, and more particularly, to a liquid-cooled solid-state laser structure.

2. Description of Related Art

Neodymium-doped yttrium lithium fluoride (Nd:YLF) is a very attractive laser material for many medium-to-high average power diode-pumped solid-state laser applications due to its long fluorescence lifetime, natural birefringence, intermediate gain, and low thermal lensing. Unfortunately, Nd:YLF has a low thermal stress fracture limit which heretofore has limited its use in commercial and military systems. Part of the stress fracture problem in liquid-cooled Nd:YLF lasers comes from within the flow channel. As the laser rod expands under a thermal load, stresses around the rod in the vicinity of an O-ring that seals the cooling jacket can cause the rod ends to fracture. As a result, the laser crystal is destroyed and the coolant can escape from the flow channel and contaminate other optical elements within the laser.

Currently, post-fabrication procedures are being developed to strengthen the surface of Nd:YLF rods. These procedures, which involve multiple etch and polish steps, are designed to remove the microcracks at the surface of the crystal which are believed to be the cause of the low thermal stress fracture limit in the Nd:YLF rods fabricated by conventional methods. Unfortunately, the improved stress fracture characteristics achieved using such strengthening procedures are difficult to preserve as the rods are handled during transport, manufacturing assembly, and maintenance. This is because handling the rods can result in scratches, digs, chips, and other surface damage which serve as nucleation sites for large-scale fracture when the rod is placed under mechanical and thermal stress. Furthermore, erosion of the rod surface by the cooling fluid may produce weak spots which can also serve as nucleation sites for fracture.

There is no known prior art directly related to the relief of mounting stresses in medium-to-high average power liquid-cooled solid-state lasers. U.S. Pat. No. 4,637,028 entitled "Conductively Cooled Laser Rod," and U.S. Pat. No. 4,969,155 entitled "Integrating Laser-Diode-Pumped Laser Apparatus", which are assigned to the assignee of the present invention, use (1) a sapphire ($Al_2O_3$) insert to conduct the heat from the laser rod and (2) an elastomer to suspend the laser rod. Both patents use a conductive interface between the sapphire insert and the surrounding metal heat sink to remove the heat from the sapphire insert. This conductive cooling approach is well suited for smaller size rods operated at low to medium power levels. However, for large rod sizes and/or high average power operation, liquid cooling is the preferred cooling method.

It would therefore be an advantage in the solid state laser art to have a laser structure that reduces thermally-induced mounting stresses on low fracture strength solid-state laser media and is compatible with liquid cooling.

SUMMARY OF THE INVENTION

In order to provide for the above and other advantages, the present invention provides for a laser structure that virtually eliminates (1) rod surface damage due to handling, (2) erosion of the rod surface by the coolant, and (3) mounting stress on low fracture strength solid-state laser rods. This is accomplished by providing (1) a transparent sleeve of relatively high strength optical material that has relatively high thermal conductivity around the laser rod, and (2) a thin layer of elastomer between the laser rod and the transparent sleeve. A cooling fluid flow channel is provided around the rod, elastomer, and sleeve that provides for the flow of coolant therethrough. The arrangement of laser rod, transparent sleeve, and elastomer performs three functions. First, the transparent sleeve allows sealing of the cooling fluid flow channel disposed around the laser rod/sleeve assembly through conventional means such as O-rings and deformable collets without applying stress directly to the laser rod. This reduces the risk of fracturing the laser rod due to thermal expansion near the seal and allows the laser to be operated at higher average power levels. Second, the thin layer of elastomer and high thermal conductivity sleeve efficiently conduct heat from the laser rod to the surrounding cooling liquid. Third, the layer of elastomer and sleeve efficiently transmit pump light from the pump source into the laser rod.

Because the laser rod, elastomer, and transparent sleeve are separate structures, the materials comprising these structures are typically selected in concert to provide the best overall performance for a given application. Crystalline sapphire ($Al_2O_3$), for example, is extremely strong and rugged, has the highest thermal conductivity of the common optical materials, is transparent to the diode pump wavelength, and is easy to manufacture in long, thin-wall sleeve structures with tight straightness tolerances. Crystalline magnesium fluoride ($MgF_2$) is significantly stronger than laser rods made from Nd:YLF, has a reasonably high thermal conductivity, and provides an almost perfect index match to the cooling liquid (water) and elastomer. Also, by choosing a proper crystallographic orientation, the linear expansion coefficient of $MgF_2$ may be matched to within 5% of the value of YLF, virtually eliminating any shear stress in the capping material that is used to seal the elastomer at the ends of the laser rod. If sufficient shear stress was present, it could cause the capping material to tear or separate from one of the surfaces, allowing the elastomer to flow to the outout surface of the laser rod where it could cause optical damage.

The present invention is an important development leading to an efficient, affordable, and reliable high pulse rate (>100 Hz), medium energy (>2 Joule per pulse) solid-state laser.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 1a and 1b show respective end and side cross sectional views of a liquid-cooled, solid-state laser rod structure mounted in a stress-free manner in accordance with the principles of the present invention;

DESCRIPTION OF THE PREFERRED EMBODIMENTS

Figure 1A:
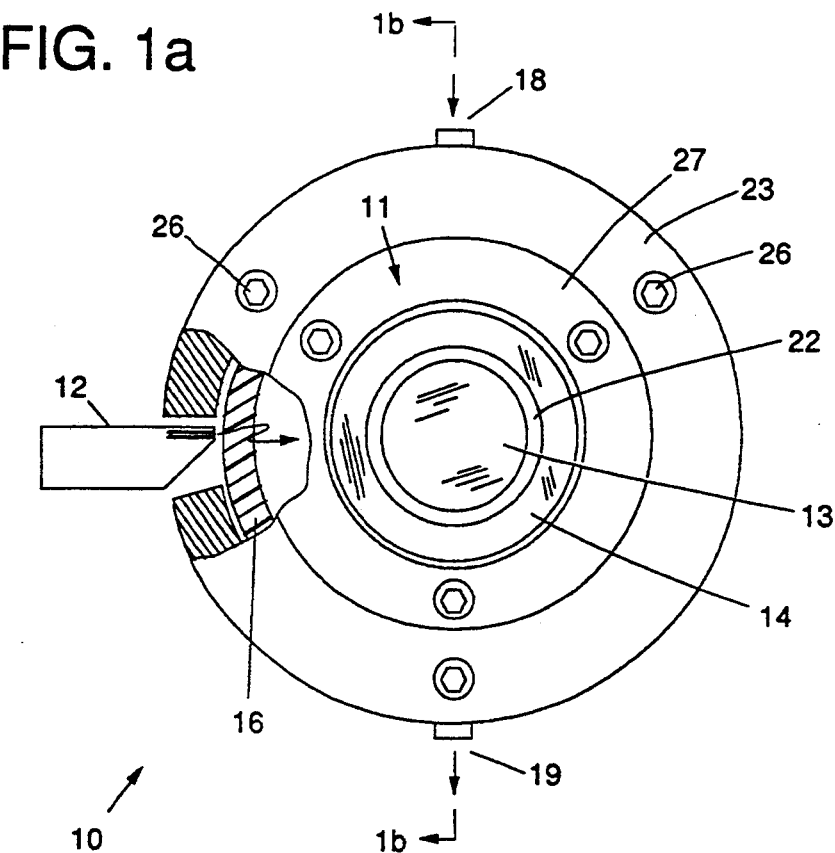

Referring to the drawing figures, FIGS. 1a and 1b show an end view and a side cross sectional view, respectively, of a solid-state laser 10 comprising a liquid-cooled solid-state laser rod structure 11 mounted in a stress-free manner in accordance with the principles of the present invention. The solid-state laser 10 includes an optical pumping means such as an array 12 of laser pump diodes, or flashlamps. The liquid-cooled solid-state laser rod structure 11 is comprised of a solid state laser medium 13 or laser rod 13. The laser rod 13 comprises neodymium-doped yttrium lithium fluoride (Nd:YLF), for example. The laser rod 13 is typically cylindrical and is optically pumped through its cylindrical surface by means of the diode array 12 or flashlamps.

A transparent sleeve 14 of relatively high strength optical material that has relatively high thermal conductivity is disposed around the periphery of the laser rod 13. The transparent sleeve 14 may comprise magnesium fluoride (MgF$_2$), for example. The transparent sleeve 14 is sealed to the mounting structure 23 by O-rings 24 and mounting plates 25, for example.

A thin layer of elastomer 15 is disposed between the laser rod 13 and the transparent sleeve 14. The elastomer 15 may be a silicone gel material, such as is produced by mixing product numbers 3-6527A and B additives, manufactured by Dow Corning. The elastomer is sealed and held in place by a capping material 22, such as DC 93500 silicone rubber, obtained from Dow Corning. An outer structure, such as a transparent outer cooling sleeve 16, typically comprising glass, is typically disposed around the liquid-cooled solid-state laser rod structure 11. The outer structure may be a separate sleeve or it may be integral with the base structure, such as a channel provided through the base structure through which cooling fluid may flow. The outer cooling sleeve 16 is sealed to the mounting structure 23 by O-rings 17, and the mounting structure 23 is bolted to a base structure 27, for example. Inlet and outlet ports 18, 19 are provided to permit the flow of cooling fluid 21 (typically water) through a cooling channel 20 formed between the outer cooling sleeve 16 and the transparent sleeve 14. Screws 26 are employed to secure the mounting structure 23, base structure 27 and mounting plates 25 together.

The present invention substantially relies on the mechanical, thermal, and optical properties of the solid-state material that forms the transparent sleeve 14 and the matching of the thermal and optical properties of the transparent sleeve 14 to those of the cooling fluid 21, the elastomer 15, and the laser rod 13. The various parameters to be addressed for proper performance include the refractive index, linear expansion coefficient, thermal conductivity, and thermal stress resistance of each of these materials. The refractive indices of each of the materials are given in Table I.

TABLE I

| REFRACTIVE INDICES | | |
|---|---|---|
| STRUCTURE | MATERIAL | REFRACTIVE INDEX @ 800 nm |
| outer cooling sleeve | glass | 1.45 |
| cooling fluid | water | 1.33 |
| transparent sleeve | Al$_2$O$_3$ | 1.76 to 1.77 |
| transparent sleeve | MgF$_2$ | 1.375 ($n_o$), 1.387 ($n_e$) |
| elastomer | silicone gel | 1.45 |
| laser material | YLF | 1.450 ($n_o$), 1.473 ($n_e$) | n = refractive index;
$o$ = ordinary; and
$e$ = extraordinary

For index matching, MgF$_2$ is an optimum material for the sleeve 14. For normal incidence at the water/sleeve interface, the worst-case Fresnel loss for 800 nm laser-diode pump light from the laser diode array 12 is quite low at 0.04% per surface for the $n_e$ ray. At the sleeve/elastomer interface, the worst case Fresnel loss is 0.05% per surface for the $n_o$ ray. Furthermore, because the sleeve 14 is a lower index material than the elastomer 15, total internal reflection of the pump light is impossible. The use of a conventional sapphire insert as the sleeve 14 introduces total internal reflection and greater Fresnel reflections because of the index mismatch (n=1.76 to 1.77).

To properly match the thermal linear expansion coefficients, the relative crystallographic orientation of the various elements is important. Because these coefficients are a function of the respective crystalline axes, the laser material 13 and the sleeve 14 can be matched almost perfectly. Table II gives the relevant linear expansion coefficient values and indicates that a near perfect thermal expansion match exists for YLF laser material 13 and a MgF$_2$ sleeve 14.

TABLE II

| LINEAR EXPANSION COEFFICIENTS | | |
|---|---|---|
| STRUCTURE | MATERIAL | LINEAR EXPANSION COEFFICIENT ($10^{-6}$/K) |
| transparent sleeve | MgF$_2$ | 13.9 (//c); 8.7 ($\perp$c) |
| transparent sleeve | Al$_2$O$_3$ | 6.8 (//c); 5.4 ($\perp$c) |
| laser material | YLF | 8.3 (//c); 13.3 (//a) |

Figure 2:
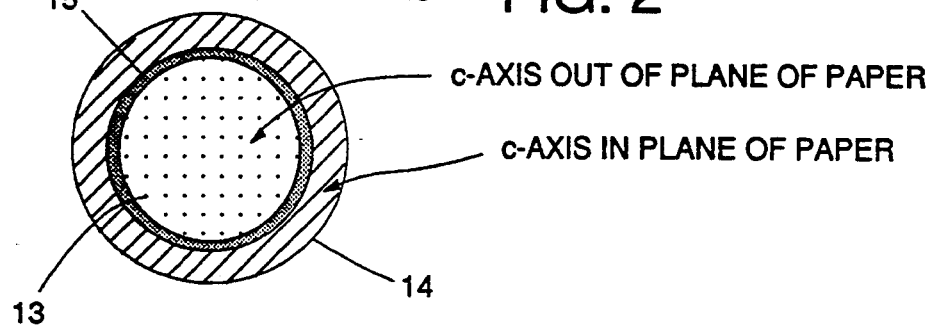
FIG. 2 shows an end view of a preferred embodiment of the present invention with a first orientation of the c-axes of a Nd:YLF laser rod and MgF$_2$ sleeve that provides for an optimum linear expansion coefficient match.
Figure 3:
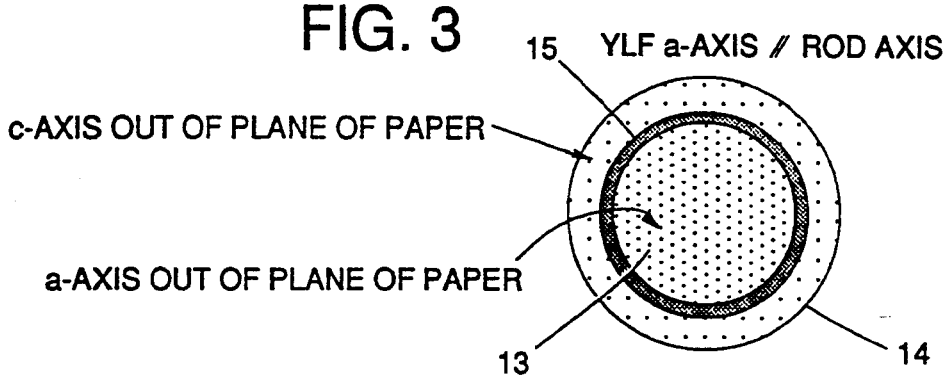
FIG. 3 shows an end view of a preferred embodiment of the present invention with a second orientation of the appropriate crystalline axes of a Nd:YLF laser rod and MgF$_2$ sleeve that provides for an optimum linear expansion coefficient match.

// indicates parallel to axis noted;
$\perp$ indicates perpendicular to axis noted FIGS. 2 and 3 show end views of two different orientations of the crystalline axes of the laser material 13 and sleeve 14 that provides for an optimum linear expansion coefficient match. If the YLF laser material 13 is oriented with its longitudinal axis parallel to its c axis (FIG. 2), then the best thermal match for the sleeve 14 is to orient its c axis perpendicular to the longitudinal axis of the sleeve 14. If the longitudinal axis of the YLF laser material 13 is parallel to its a axis (FIG. 3), then the c axis of the sleeve 14 should be oriented parallel to the longitudinal axis of the sleeve 14. Because of the near perfect match between the linear expansion coefficients, the resulting benefit is a significantly reduced stress and strain on the capping material 22.

Thermal conductivity values for various materials are given in Table III.

TABLE III

| | | THERMAL CONDUCTIVITY | |
|---|---|---|
| STRUCTURE | MATERIAL | THERMAL CONDUCTIVITY (W/mK) |
| transparent sleeve | MgF$_2$ | 11.6 (orientation unspecified) |
| transparent sleeve | Al$_2$O$_3$ | 35 (//c), 33 (⊥c) |
| laser material | YLF | 6.3 (//a) |

As Table III indicates, the thermal conductivity of MgF$_2$ is nearly twice that of YLF. The thermal conducitvity of Al$_2$O$_3$ is five times that of MgF$_2$. Furthermore, due to the better machinability of Al$_2$O$_3$, thinner wall sleeves can be fabricated and the thermal conductance of the Al$_2$O$_3$ sleeve structure can be significantly higher than for MgF$_2$.

Finally, for estimating the thermal loading capability of a material, a good figure of merit is the thermal stress resistance parameter. This parameter is given by the formula $R_T = [\sigma_f \kappa (1-\nu)]/\alpha E$ where $\sigma_f$ is the tensile fracture strength, $\kappa$ is the thermal conductivity, $\nu$ is Poisson's ratio, $\alpha$ is the linear expansion coefficient, and E is the elastic modulus. The $R_T$ parameter values for various materials are given in Table IV.

TABLE IV

| THERMAL STRESS RESISTANCE PARAMETERS | | |
|---|---|---|
| STRUCTURE | MATERIAL | $R_T$(W/m) |
| transparent sleeve | MgF$_2$ | 1300 |
| transparent sleeve | Al$_2$O$_3$ | 3400 |
| laser material | YLF | 140 |

As Table IV indicates, the $R_T$ value for MgF$_2$ is approximately 10 times greater than that of YLF, and Al$_2$O$_3$ has an $R_T$ value that is three times higher than MgF$_2$. Both materials are more than adequate, based on thermal stress resistance and mounting stress resistance.

Because the laser rod 13, elastomer 15, and transparent sleeve 14 are separate structures, the materials comprising these structures may be selected in concert to provide the best overall performance for a given application. A preferred embodiment of the present invention for high average power, high output energy diode-pumped laser amplifier applications uses Nd:YLF as the laser medium 13 due to (1) its long fluorescence lifetime which allows fewer diode pump arrays to be used (2) its natural birefringence which avoids the complexity of depolarization compensation, (3) its intermediate gain which is low enough to provide good energy storage yet high enough to allow saturated energy extraction without damage, and (4) its low thermal lensing rate which minimizes optical distortion of the amplified laser beam. Silicone gel is used as the elastomer 15 due to (1) its low absorption at the diode pump wavelength (about 800 nm), (2) its adequate thermal conductance, when formed in a thin layer, and good thermal interface which help to maintain the laser rod at a reasonable temperature (<100° C.) under high thermal loads, (3) its index match to the Nd:YLF material which enhances the pumping and energy storage efficiency, and (4) its low chemical activity when in contact with YLF. Both crystalline sapphire (Al$_2$O$_3$) and crystalline magnesium fluoride (MgF$_2$) are suitable materials for the transparent sleeve 14.

Crystalline sapphire (Al$_2$O$_3$) is extremely strong and rugged, has the highest thermal conductivity of the common optical materials, is transparent to the diode pump wavelength, and is easy to manufacture in long, thin-wall sleeve structures with tight straightness tolerances. However, sapphire does not provide a good optical index match between the liquid cooling fluid 21 and the elastomer 15 (the refractive index of sapphire is between 1.76 and 1.77 at 800 nm). As a result, Fresnel reflections of the pump wavelength at these interfaces reduce the pumping efficiency of the laser. Moreover, the Fresnel and total internal reflections enhance the likelihood of parasitic lasing which decreases the energy storage efficiency of the laser rod 13. Optical interference coatings may be applied to the sapphire sleeve 14 to minimize the effects of the Fresnel reflections.

Crystalline magnesium fluoride (MgF$_2$) is significantly stronger than laser rods 13 made from Nd:YLF, has a reasonably high thermal conductivity, and provides an almost perfect index match to the cooling fluid 21 (water) and elastomer 15. Also, by choosing a proper crystallographic orientation, the linear expansion coefficient of MgF$_2$ may be matched to within 5% of the value of YLF, virtually eliminating any shear stress in the capping material 22 that is used to seal the elastomer 15 at the ends of the laser rod 13. If sufficient shear stress was present, it could cause the capping material 22 to tear or separate from one of the surfaces, allowing the elastomer 15 to migrate or creep to the output surface of the laser rod 13 where it could cause optical damage.

Thus, there has been described an improved liquid-cooled index-matched solid-state laser structure. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A laser structure comprising:
    a laser material;
    a transparent sleeve of relatively high strength optical material that has relatively high thermal conductivity disposed around the laser material;
    an elastomer layer disposed between the laser material and the transparent sleeve; and
    an outer structure disposed around the periphery of the transparent sleeve, and wherein said outer structure provides a cooling channel that is adapted to permit the flow of cooling fluid therethrough;
    whereby the transparent sleeve allows sealing of the cooling channel without applying stress directly to the laser material, thus reducing the risk of fracturing the laser material due to thermal expansion near the seal and allowing the laser to be operated at higher average power levels, and whereby the transparent sleeve and thin elastomer layer protect the laser material from surface damage due to handling, and whereby the thin elastomer layer and high thermal conductivity transparent sleeve efficiently conduct heat from the laser material to the surrounding cooling fluid, and whereby the elastomer and transparent sleeve transmit pump light into the laser material.

2. The laser structure of claim 1 wherein the laser material comprises neodymium-doped yttrium lithium fluoride (Nd:YLF).

3. The laser structure of claim 1 wherein the transparent sleeve material comprises crystalline sapphire ($Al_2O_3$).

4. The laser structure of claim 1 wherein the transparent sleeve material comprises crystalline magnesium fluoride ($MgF_2$).

5. The laser structure of claim 2 wherein the transparent sleeve material comprises crystalline magnesium fluoride ($MgF_2$).

6. The laser structure of claim 1 wherein the cooling fluid comprises an aqueous solution.

7. The laser structure of claim 6 wherein the aqueous solution comprises water.

8. The laser structure of claim 1 wherein the elastomer layer comprises a silicone gel.

9. The structure of claim 1 further comprising a capping material disposed at respective ends of the laser material that is used to seal the elastomer layer.

10. The laser structure of claim 5 wherein an optimum thermal match between the Nd:YLF laser material and the $MgF_2$ sleeve is achieved by orienting the laser material with its longitudinal axis parallel to its c axis, and orienting the c axis of the transparent sleeve perpendicular to the longitudinal axis of the sleeve.

11. The laser structure of claim 5 wherein an optimum thermal match between the Nd:YLF laser material and the $MgF_2$ sleeve is achieved by orienting the laser material with its longitudinal axis parellel to its a axis, and orienting the c axis of the transparent sleeve parallel to the longitudinal axis of the sleeve.

12. The laser structure of claim 10 further comprising a capping material adapted to seal and secure the elastomer layer between the laser material and the transparent sleeve.

13. The laser structure of claim 11 further comprising a capping material adapted to seal and secure the elastomer layer between the laser material and transparent sleeve.

14. The laser structure of claim 1 wherein the laser material is a cylindrical rod optically pumped through its cylindrical surface.

15. The laser structure of claim 1 wherein the laser material is optically pumped with at least one semiconductor laser diode.

16. The laser structure of claim 1 wherein the laser material is optically pumped with a flashlamp.

17. The laser structure of claim 15 wherein said outer structure comprises an outer sleeve disposed around the periphery of the transparent sleeve and around the cooling fluid thus forming a cooling channel between the outer sleeve and the transparent sleeve that is adapted to permit the flow of cooling fluid therethrough, wherein said outer sleeve is transparent at the emission wavelength of the semiconductor laser diode.

* * * * *